United States Patent [19]
Wirt

[11] Patent Number: 6,108,498
[45] Date of Patent: Aug. 22, 2000

[54] CARTRIDGE RECEIVING APPARATUS

[75] Inventor: Michael L. Wirt, Avon, N.Y.

[73] Assignee: Eastman Kodak Company, Rochester, N.Y.

[21] Appl. No.: 08/992,853

[22] Filed: Dec. 18, 1997

[51] Int. Cl.[7] .................................................. G03B 17/02
[52] U.S. Cl. ......................... 396/536; 396/538; 396/543
[58] Field of Search .................................. 396/403, 405, 396/411, 413, 536, 538, 543

[56] References Cited

U.S. PATENT DOCUMENTS

| | | | |
|---|---|---|---|
| 2,168,998 | 8/1939 | Lindenberg | 396/411 |
| 3,423,041 | 1/1969 | Steisslinger et al. | 396/413 |
| 3,479,940 | 11/1969 | Nerwin | 396/413 |
| 3,511,154 | 5/1970 | Simon | 396/413 |
| 3,602,121 | 8/1971 | Ernisse | 396/536 |
| 4,714,335 | 12/1987 | Malloy | 396/413 |
| 4,994,828 | 2/1991 | Smart | 396/284 |
| 5,032,861 | 7/1991 | Pagano | 396/515 |
| 5,307,099 | 4/1994 | Kawamura et al. | 396/207 |
| 5,323,201 | 6/1994 | Richiuso et al. | 396/536 |
| 5,382,992 | 1/1995 | Kawamura et al. | 396/207 |
| 5,555,055 | 9/1996 | Stephenson | 396/395 |
| 5,654,788 | 8/1997 | Kuhn | 396/284 |

*Primary Examiner*—Eddie C. Lee
*Attorney, Agent, or Firm*—Susan L. Parulski

[57] ABSTRACT

A cartridge is disposed in a chamber of a cartridge receiving apparatus. An actuating member on the apparatus is moveable a first increment to initiate an apparatus operation and moveable a second increment. A latch is positioned to prevent the actuating member from being moved the second increment after it is moved the first increment. The actuating member is moved the second increment only when the cartridge is at least partially removed from the chamber. The cartridge receiving apparatus may further include a prevention member to prevent the chamber from receiving an exposed filmstrip.

15 Claims, 5 Drawing Sheets

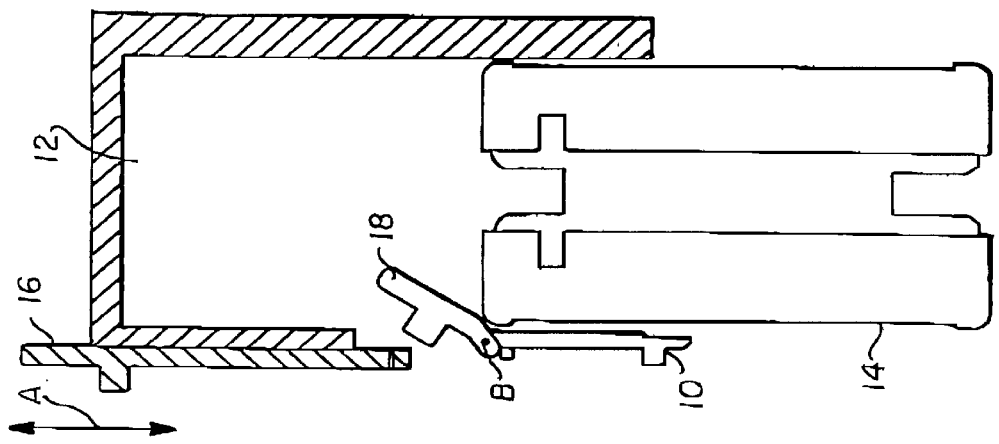
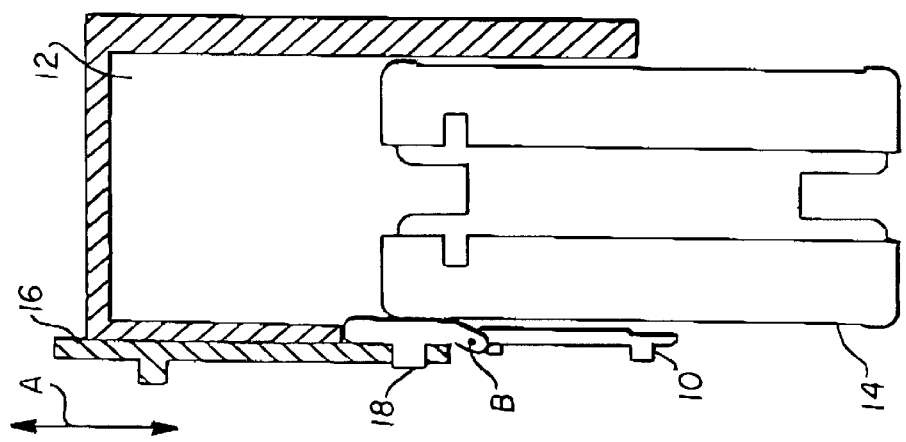
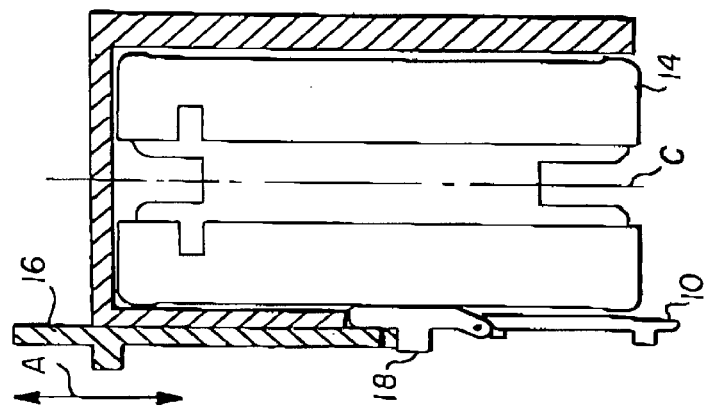

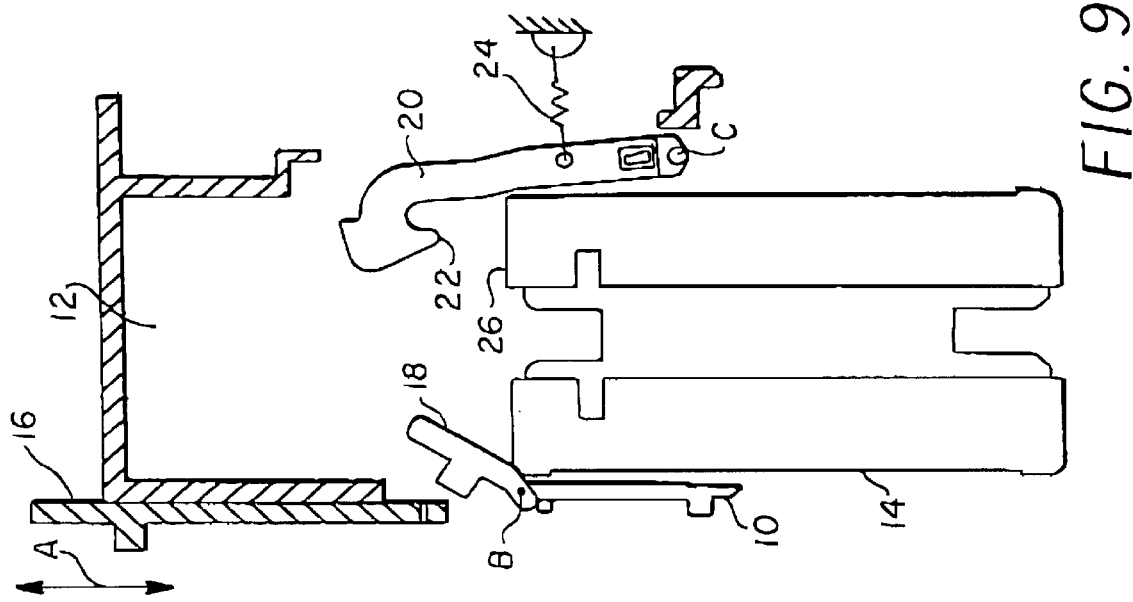
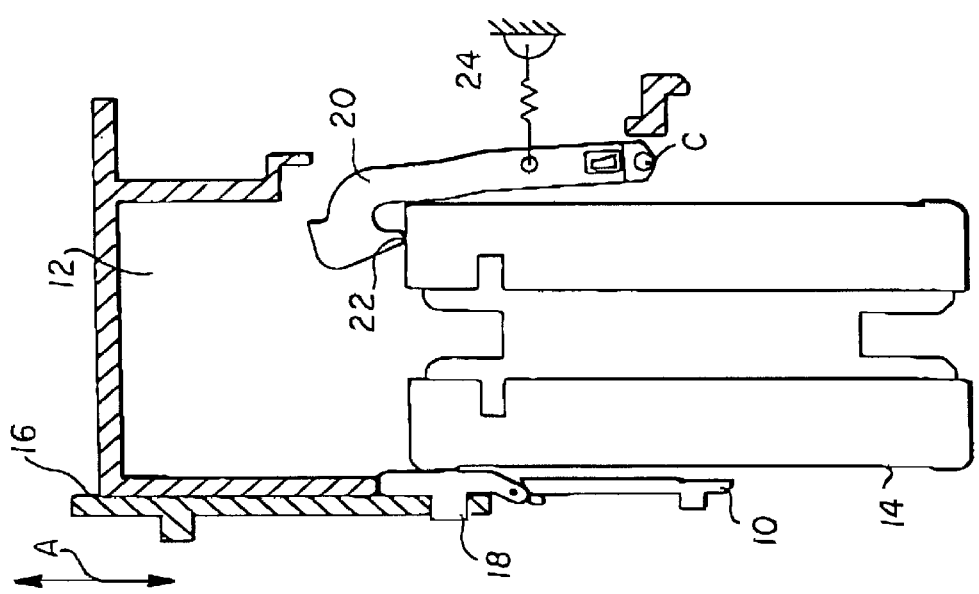

CARTRIDGE RECEIVING APPARATUS

FIELD OF THE INVENTION

The present invention relates generally to an apparatus for receiving a cartridge. More particularly, the present invention is directed to the field of photographic cameras wherein an exposed film strip is rewound into a light-tight cartridge prior to the removal of the light-tight cartridge from the camera.

BACKGROUND OF THE INVENTION

Cameras may be provided with a mechanism for rewinding a filmstrip back into a light-tight film cartridge after the filmstrip has been exposed. The activation of the rewind mechanism can be automatic or manual. Once the filmstrip is wound back into the film cartridge, there is a disadvantage that, if the film cartridge remains in the camera, the exposed filmstrip may again be unwound from the cartridge and re-exposed. As such, film wastage or spoilage could occur through the double exposure of the film strip.

Accordingly, a need continues to exist for an apparatus which provides for the removal of a film cartridge from a camera after a filmstrip is wound back into the film cartridge, thereby preventing double exposure of the film strip. More generally, a need continues to exist for a cartridge receiving apparatus wherein an actuating member is moved from an actuation position only when a cartridge is at least partially removed from a chamber in the cartridge receiving apparatus.

SUMMARY OF THE INVENTION

An object of the invention is to provide a cartridge receiving apparatus wherein an actuating member is moved out of an actuation position when a cartridge is at least partially removed from a chamber in the cartridge receiving apparatus.

Another object of the invention is to provide an apparatus for a camera which provides for the removal of a film cartridge from the camera after a filmstrip is wound back into the film cartridge.

These objects are given only by way of illustrative example. Thus, other desirable objectives and advantages inherently achieved by the disclosed invention may occur or become apparent to those skilled in the art. The invention is defined by the appended claims.

According to one aspect of the invention, there is provided a cartridge receiving apparatus including a chamber for receiving a cartridge. The apparatus also includes an actuating member which is moveable a first increment to initiate an apparatus operation and moveable a second increment. A latch disposed on the apparatus is positioned to prevent the actuating member from being moved the second increment after it is moved the first increment. The actuating member is supported to be moved the second increment only when the cartridge is at least partially removed from the chamber. The cartridge receiving apparatus may further include a prevention member to prevent the chamber from receiving the at least partially removed cartridge from the chamber, thereby preventing re-insertion of the rewound film cartridge into the chamber.

According to another aspect of the present invention, there is provided a camera having a chamber for receiving a film cartridge. The camera also includes an actuating member moveable from a first position to a second position wherein rewinding of a filmstrip back into the cartridge is initiated. A latch disposed on the camera is positioned to retain the actuating member in the second position, and releases the actuating member from the second position when the film cartridge is at least partially removed from the chamber.

The apparatus of the present invention provides a cartridge receiving apparatus wherein an actuating member is moved from an actuation position when a cartridge is at least partially removed from a chamber in the cartridge receiving apparatus. In a camera, the apparatus of the present invention provides for the removal of a film cartridge from the camera after a film strip is wound back into the camera, thereby reducing the likelihood of double exposure of the film strip. The present invention provides for a reduced number of mechanically associated components, thereby reducing the cost of the apparatus.

BRIEF DESCRIPTION OF THE DRAWINGS

The foregoing and other objects, features, and advantages of the invention will be apparent from the following more particular description of the preferred embodiments of the invention, as illustrated in the accompanying drawings.

FIGS. 3, 4, and 5 show cross-sectional views of the cartridge receiving apparatus, serially depicting a sequence of operation.

FIGS. 6, 7, 8, and 9 show cross-sectional views of the cartridge receiving apparatus including a prevention member, serially depicting a sequence of operation.

DETAILED DESCRIPTION OF THE INVENTION

Figure 1:
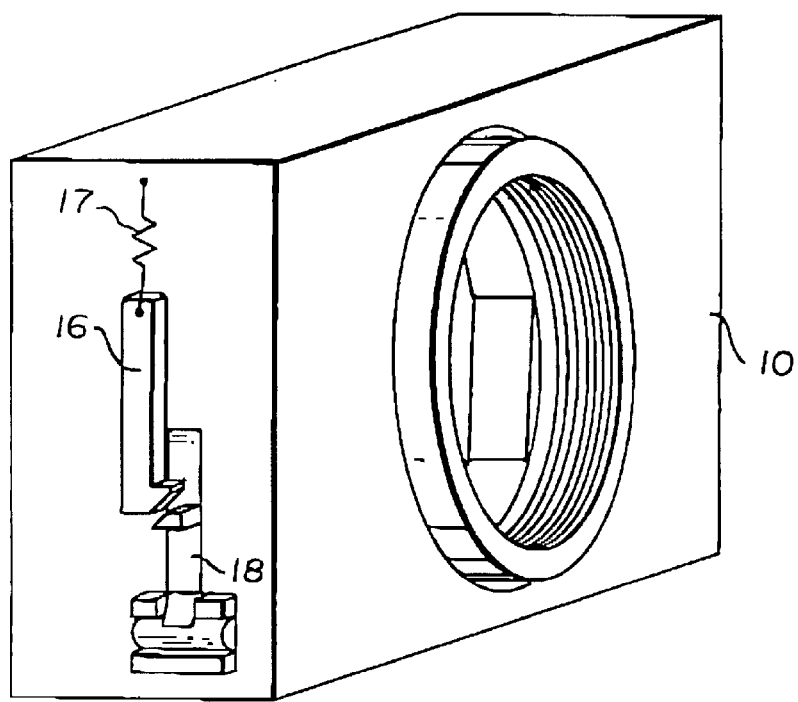
FIG. 1 shows a perspective view of a camera illustrating a cartridge receiving apparatus in accordance with the present invention wherein an actuating member is in a first position.

The following is a detailed description of the preferred embodiments of the invention, reference being made to the drawings in which the same reference numerals identify the same elements of structure in each of the several figures.

The present invention is directed to a cartridge receiving apparatus. An example of such a cartridge receiving apparatus is generally illustrated in FIG. 1 as a camera 10.

Referring to FIGS. 1 through 5, camera 10 includes a chamber 12 adapted to receive a cartridge 14. Camera 10 further includes an actuating member 16 which can be manually or automatically actuated. Generally, actuating member 16 is moveable a first increment to initiate an apparatus operation and moveable a second increment. A latch 18 is positioned to prevent actuating member 16 from being moved the second increment after it is moved the first increment. Actuating member 16 is supported to be moved the second increment only when cartridge 14 is at least partially removed from chamber 12.

Examples of apparatus operations which can be initiated by actuating member 16 include the rewinding of a filmstrip back into cartridge 14, or the reinitialization of a film counter (not shown). For ease of discussion, the example of an apparatus operation which will be referred to is the rewinding of the filmstrip back into cartridge 14.

Referring specifically to FIGS. 1 and 3, in operation, a user loads a camera with a filmstrip by positioning cartridge 14 within chamber 12 of camera 10. As illustrated, actuating member 16 is in a first position and latch 18 is positioned to sense the presence or absence of cartridge 14 in chamber 12. In the example shown, latch 18 senses cartridge 14 by abutting the cartridge.

Figure 2:
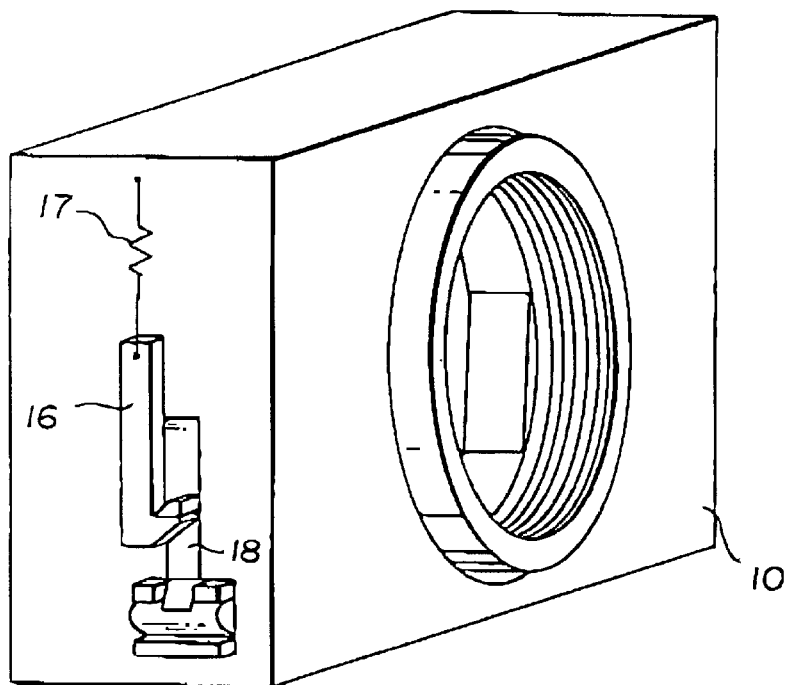
FIG. 2 shows a perspective view of a camera illustrating the cartridge receiving apparatus of FIG. 1 wherein the actuating member is in a second position to initiate an apparatus operation.

When the user has exposed the filmstrip and desires the exposed filmstrip to be wound back into cartridge 14, actuating member 16 is moved to a second position, shown in FIGS. 2 and 4. Actuating member 16 is moved along a direction A to mechanically associate and retain actuating member 16 with latch 18, thereby preventing the movement of actuating member 16 to the first position. With actuating member 16 in the second position, the filmstrip is wound back into cartridge 12.

Those skilled in the art recognize that rewind of the film into cartridge 14 is accomplished by winding the film about the rotational axis C of cartridge 14, illustrated in FIG. 3, which is substantially parallel to direction A. When the film rewind is complete, actuating member 16 is moved out of the second position when cartridge 14 is at least partially removed from chamber 12. Specifically, latch 18 is mounted to pivot about an axis B perpendicular to direction A, and consequently perpendicular to axis C. As illustrated in FIG. 5, when cartridge 14 is moved relative to chamber 12 past latch 18, latch 18 is free to pivot about axis B, and actuating member 16 is released from its mechanical association with latch 18. On release from latch 18, actuating member 16 returns to the first position. Latch 18 may be biased to release actuating member 16, for example by a resilient member. Alternatively, a latching surface on latch 18 which contacts actuating member 16 to retain the actuating member, may be configured to facilitate a releasing action. FIGS. 1 and 2 show latch 18 having angled surfaces providing such facilitation.

For the example shown in FIG. 5, actuating member 16 moves back to the first position when cartridge 14 is at least partially removed from chamber 12. This can be accomplished by biasing actuating member 16 in the first position, for example by a resilient member 17 as shown in FIGS. 1 and 2. Alternately, actuating member 16 may be biased to move to a third position, different from the first and second position, when released from its mechanical association with latch 18.

Cameras have been provided with apparatus for preventing the loading of an exposed filmstrip into the camera. U.S. Pat. Nos. 4,994,828, 5,032,861, and 5,654,788 commonly assigned and incorporated herein by reference, provide such apparatus for preventing loading of exposed filmstrips.

Referring to FIGS. 6–9, the cartridge receiving apparatus of the present invention can include a prevention member 20 to prevent the loading of an exposed filmstrip. Further, prevention member 20 can be arranged to work jointly with actuating member 16 and latch 18 to prevent the re-insertion of the partially removed cartridge from the chamber.

Figure 6:
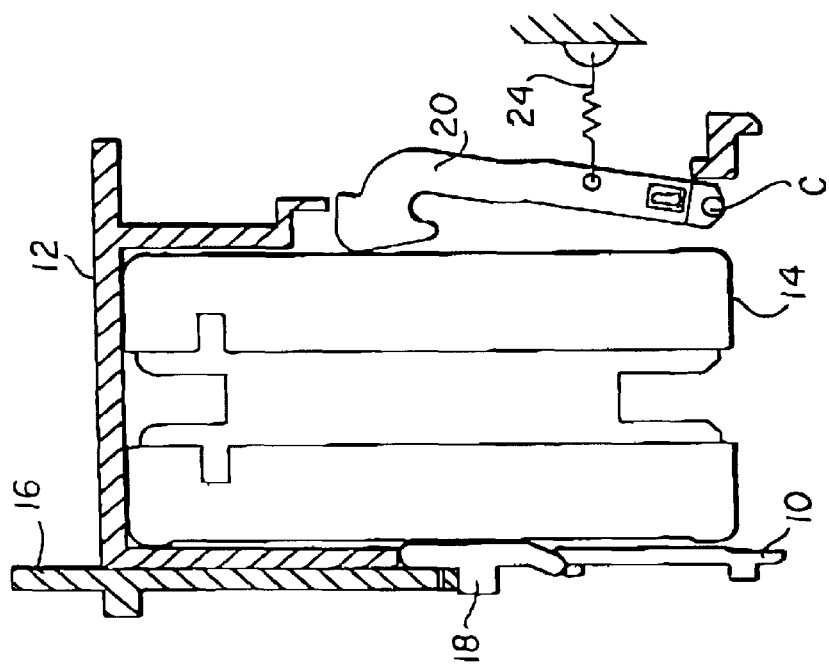
Figure 10:
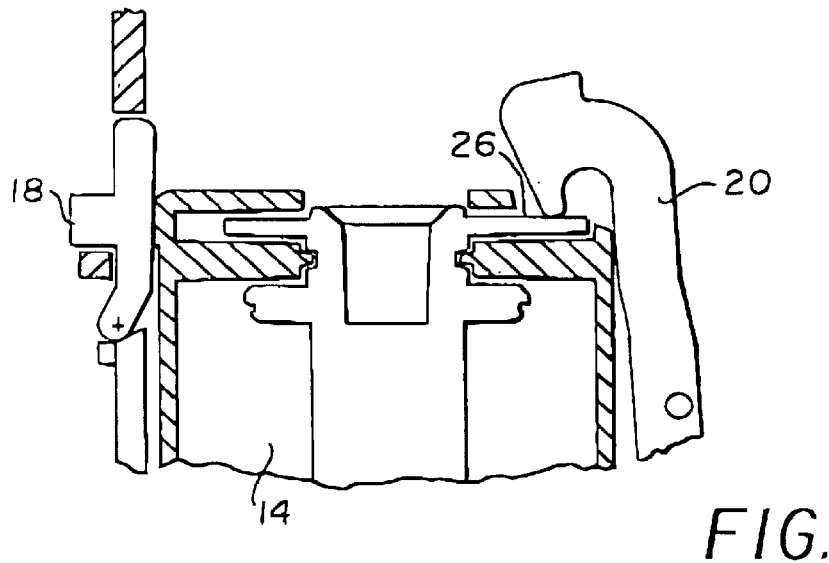
FIG. 10 shows a partial cross-sectional view of the prevention member not engaging with the cartridge.
Figure 11:
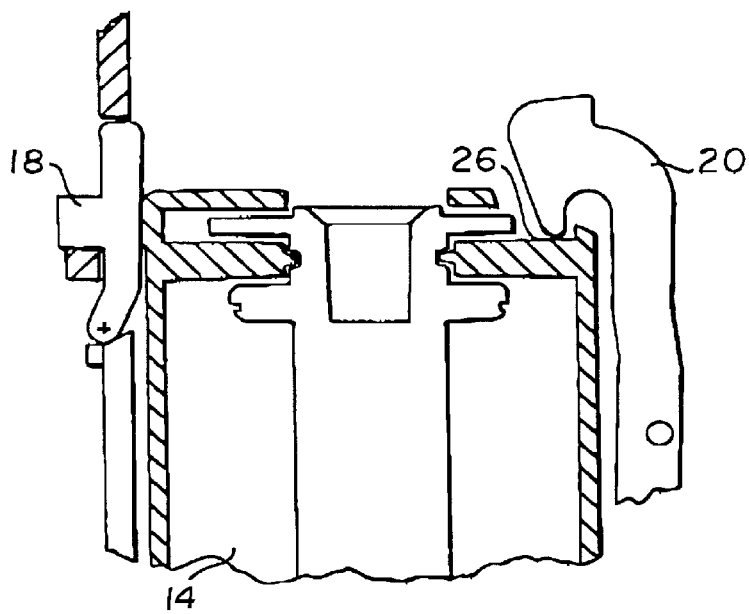
FIG. 11 shows a partial cross-sectional view of the prevention member engaging with the cartridge to block insertion of the cartridge in the chamber.

Referring still to FIGS. 6–9, prevention member 20 is mounted so as to pivot about a point C between a non-prevention position and a prevention position. FIG. 6 illustrates prevention member 20 in the non-prevention position. Prevention member 20 is positioned in the non-prevention position when cartridge 14 is disposed fully within the chamber. FIG. 9 illustrates prevention member 20 in the prevention position wherein a prevention surface 22 of prevention member 20 is disposed within the chamber. Prevention member 20 is biased in the prevention position by means known to those skilled in the art, for example, by a resilient member 24. To prevent loading of cartridge 14 in chamber 12, prevention member 20 mechanically interferes with the loading. Such a mechanical interference can be accomplished, for example, through the mechanical engagement of a status indicator disposed on an end 26 of cartridge 14 with prevention surface 22. The status indicator has two conditions; a first condition wherein the status indicator permits engagement (i.e., the filmstrip has been exposed), and a second condition wherein the status indicator does not permit engagement (i.e., the filmstrip has not been exposed). FIGS. 10 and 11 provide an example of a suitable status indicator which is formed as a notch/flat surface at the end of the cartridge. FIG. 11 illustrates the notch retaining the prevention surface to block insertion while FIG. 10 illustrates that the flat surface does not retain the prevention surface so as to not block insertion.

Figure 7:
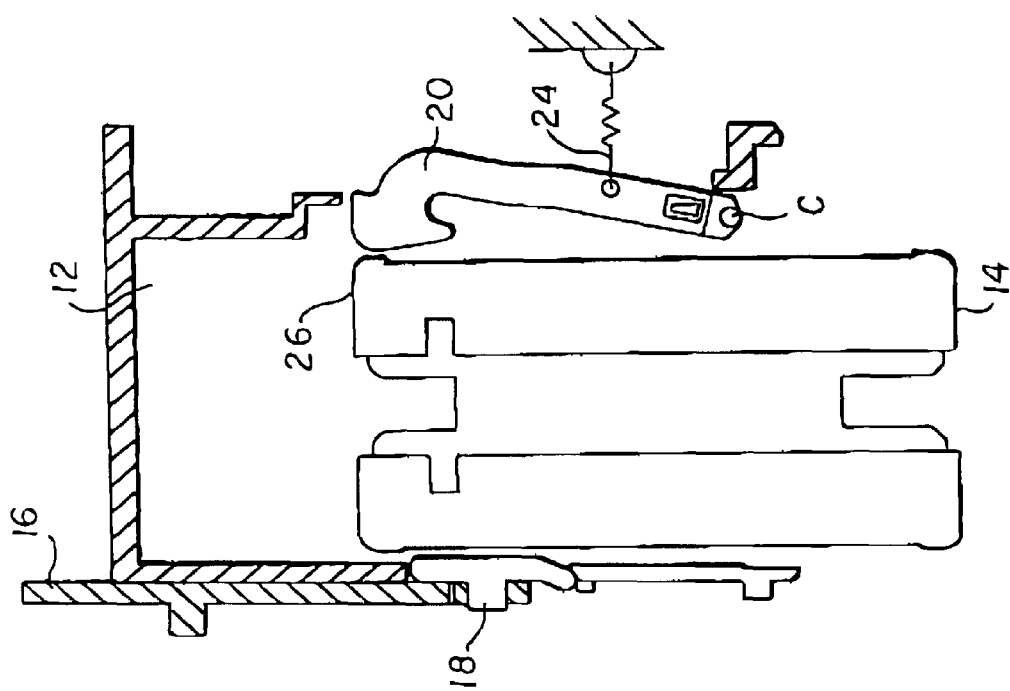

Referring now to FIG. 6, initially, when the filmstrip is not exposed, the status indicator is oriented in the second condition and so does not engage with prevention surface 22, and cartridge 14 is received into chamber 12. When the user has exposed the filmstrip, actuating member 16 is moved to the second position, as shown in FIG. 7, and latch 18 prevents the movement of actuating member 16 to the first position. With actuating member 16 in the second position, the filmstrip is wound back into cartridge 12. Once the filmstrip is wound back into cartridge 14, the status indicator changes to the first condition.

Referring now to FIGS. 7 and 8, as cartridge 14 is partially removed from chamber 12 and moves past prevention member 20, prevention member 20 pivots about point C and disposes prevention surface 22 within chamber 12. Cartridge 14 is thereby blocked from being re-inserted into chamber 12.

Referring now to FIG. 9, as cartridge 14 is further removed from chamber 12 and moves past latch 18, latch 18 pivots about point B and actuating member 16 is released from its mechanical association with latch 18. The positioning of prevention member 20 relative to latch 18 ensures that latch 18 releases actuating member 16 only after prevention member 20 prevents chamber 12 from receiving the at least partially removed cartridge. As such, prevention member 20 is arranged to work jointly with actuating member 16 and latch 18 to prevent the re-insertion of the partially removed cartridge from the chamber.

The invention has been described in detail with particular reference to a presently preferred embodiment, but it will be understood that variations and modifications can be effected within the spirit and scope of the invention. For example, the present invention may be applied generally to any apparatus having a chamber for receiving a cartridge. The presently disclosed embodiments are therefore considered in all respects to be illustrative and not restrictive. The scope of the invention is indicated by the appended claims, and all changes that come within the meaning and range of equivalents thereof are intended to be embraced therein.

What is claimed is:

1. A cartridge receiving apparatus for use with a cartridge, the cartridge receiving apparatus including a chamber for receiving a cartridge and an actuating member movable a first increment to a first position and movable a second increment from the first position, the cartridge apparatus comprising:

a latch positioned to prevent the actuating member from being moved the second increment after the actuating member is moved the first increment, the latch releasing the actuating member to move the second increment only when the cartridge is at least partially removed from the chamber.

2. The cartridge receiving apparatus according to claim 1 wherein the latch is positioned to sense the presence or absence of the cartridge in the chamber.

3. An apparatus for use with a film cartridge, the apparatus comprising:

a chamber for receiving the film cartridge;

an actuation member movable to a first position to initiate rewinding of a filmstrip back into the film cartridge; and a latch preventing the actuation member from being moved to a second position after the actuation member is moved to the first position, the latch releasing the actuation member from the first position responsive to the movement of the film cartridge relative to the chamber.

4. The apparatus according to claim 3 wherein the film cartridge has a rotational axis and the latch pivots about an axis perpendicular to the rotational axis.

5. The apparatus according to claim 3 wherein the actuation member moves to the second position when released by the latch.

6. The apparatus according to claim 3 further comprising spring means biasing the actuating member in the second position.

7. The cartridge receiving apparatus according to claim 3 wherein the latch is positioned to sense the presence or absence of the cartridge in the chamber.

8. A camera for use with a film cartridge, the camera comprising:

a chamber adapted to receive the film cartridge;

an actuating member moveable from a first position to a second position to initiate rewinding of a filmstrip back into the film cartridge; and a latch positioned to retain the actuating member in the second position, the latch releasing the actuating member from the second position when the film cartridge is at least partially removed from the chamber.

9. An apparatus for use with a film cartridge, the apparatus comprising:

a chamber for receiving the film cartridge;

an actuation member movable to a first position to initiate rewinding of a filmstrip back into the film cartridge;

a latch positioned to prevent the actuation member from being moved to a second position after the actuation member is moved to the first position, the latch releasing the actuation member from the first position when the film cartridge is at least partially removed from the chamber; and a prevention member preventing the chamber from receiving the at least partially removed film cartridge from the chamber.

10. The apparatus according to claim 9 wherein the prevention member is pivotable between a non-prevention position and a prevention position wherein a prevention surface of the prevention member is disposed within the chamber.

11. The apparatus according to claim 9 wherein the prevention member is biased in the prevention position, and is positioned in the non-prevention position when the cartridge is disposed in the chamber.

12. The apparatus according to claim 9 wherein the latch releases the actuation member only after the prevention member prevents the chamber from receiving the at least partially removed cartridge.

13. A camera, comprising:

a film cartridge including a filmstrip;

a chamber for receiving the film cartridge;

an actuation member movable to a first position; and a latch preventing the actuation member from being moved to a second position after the actuation member is moved to the first position, the latch supported to release the actuation member from the first position responsive to the movement of the film cartridge relative to the chamber.

14. The camera according to claim 13 wherein the actuation member is movable in a first direction, and the latch is pivotably mounted to rotate about an axis substantially perpendicular to the first direction.

15. The camera according to claim 14 wherein the latch is not disposed within the chamber when actuation member is in the first position.

* * * * *